United States Patent
Wu et al.

(10) Patent No.: US 8,643,309 B2
(45) Date of Patent: Feb. 4, 2014

(54) LIGHTING DEVICE AND METHOD FOR ADJUSTING SENSING REGION THEREOF

(75) Inventors: Wen-Chi Wu, Hsin-Chu (TW); Chih-Hua Lin, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 141 days.

(21) Appl. No.: 13/398,855

(22) Filed: Feb. 17, 2012

(65) Prior Publication Data

US 2012/0235599 A1 Sep. 20, 2012

(30) Foreign Application Priority Data

Mar. 16, 2011 (TW) .............................. 100108939 A

(51) Int. Cl.
 *H05B 37/02* (2006.01)
(52) U.S. Cl.
 USPC ............................ 315/307; 315/152; 315/308
(58) Field of Classification Search
 USPC .......... 315/149–159, 291, 294, 297, 307, 308
 See application file for complete search history.

(56) References Cited

U.S. PATENT DOCUMENTS

| 4,884,008 | A * | 11/1989 | Bossler et al. ................. | 315/152 |
| 7,855,376 | B2 * | 12/2010 | Cantin et al. ............. | 250/559.29 |
| 8,385,153 | B2 * | 2/2013 | Van Endert et al. ............ | 367/96 |
| 2006/0044800 | A1 * | 3/2006 | Reime ........................... | 362/276 |
| 2010/0259174 | A1 | 10/2010 | Hou et al. | |
| 2010/0265083 | A1 | 10/2010 | Hou et al. | |
| 2010/0277074 | A1 | 11/2010 | Van Endert et al. | |

FOREIGN PATENT DOCUMENTS

| TW | M331082 | 4/2008 |
| TW | 200907621 | 2/2009 |
| TW | 201021618 | 6/2010 |

OTHER PUBLICATIONS

Glolab Corporation, "Direction Sensing Infrared Motion Detector Manual" (http://www.glolab.com/freeinfo/GLDIR1.pdf), 2003, pp. 1-12.
"Office Action of Taiwan Counterpart Application" with English translation thereof, issued on Aug. 26, 2013, pp. 1-11, in which the listed references were cited.

* cited by examiner

*Primary Examiner* — Tung X Le
(74) *Attorney, Agent, or Firm* — Jianq Chyun IP Office

(57) ABSTRACT

A lighting device and a method for adjusting the sensing region thereof are provided. The lighting device includes a sensing device and an illumination unit. The sensing device is configure to detect whether an object is located at a first manipulating region or a second manipulating region so as to correspondingly emit a control signal, in which the first manipulating region and the second manipulating region are not overlapped by each other and are disposed in the sensing region along a sensing direction of the sensing device. The sensing device adjusts a shortest distance between the sensing region and the sensing device and a sensing range of the sensing region according to a first adjustment signal and a second adjustment signal. The illumination unit is coupled to the sensing device and adjusts the optical characteristic according to the control signal.

18 Claims, 4 Drawing Sheets

LIGHTING DEVICE AND METHOD FOR ADJUSTING SENSING REGION THEREOF

CROSS-REFERENCE TO RELATED APPLICATION

This application claims the priority benefit of Taiwan application serial no. 100108939, filed on Mar. 16, 2011. The entirety of the above-mentioned patent application is hereby incorporated by reference herein and made a part of this specification.

BACKGROUND OF THE INVENTION

1. Field of the Invention

The invention generally relates to a lighting device and a method for adjusting the sensing region thereof, and more particularly, to a lighting device able to be manipulated with a gesture and a method for adjusting sensing region thereof.

2. Description of Related Art

Since an object requires light illumination to be clearly identified, so that illumination lighting devices are broadly used in each indoor space. In general speaking, the connection between a controller and an illumination unit is divided into wire connection and wireless connection, and the manipulating way of a user on the controller may be divided into touching way and contactless way where there are different control requirements according to the difference of the environments. For example, in a large office, the disposition range of a lighting device is larger. In order to conveniently manipulate the lighting device, the lighting device requires wireless touching control so that the user may control the lighting device through a mobile wireless controller only without being limited by the disposition position of the controller. In addition, in a kitchen however, the hands of a user would be contaminated by smeary or food residual during cooking, so that the lighting device requires contactless control to avoid repeating environment pollution caused by smeary or food residual on hands during controlling the lighting device.

According to the mentioned above, in some circumstances, the contactless control is a better control way, for example, in a kitchen space or other regions which are unable to keep hands clean during working. On the other hand, in any environment, the touching control is easier to build a path of bacteria and virus infections so as to cause inter-infections of some contacting diseases through the controller and have potential health worry. As a result, to prevent the disease infection, the contactless control is better than the touching control.

Currently, the control detection for the contactless control of a lighting device is implemented by using IR (Infrared Ray), PIR (Pyroelectric Infrared) or ultrasonic devices. However, the IR and PIR ways are configure for switch control only, and the ultrasound has higher stability and capability to detect far and close distances. Hence, the ultrasonic control on the contactless control field is potentially good for developing.

Taiwan Patent Publication No. 200907621 discloses a lighting device and a method thereof, in which when an object is located at an active region, a lighting device adjusts the luminance thereof according to the distance between the object and the lighting device. US Patent Publication No. 20100259174 discloses a control method of an illumination system, in which when an object enters a sensing region of an ultrasonic transceiver, a control enabling region, a first control region, a second controller and a waiting-up region are defined according to the distance between the object and the ultrasonic transceiver. When the object moves into the first control region, the color of a light source would be ceaselessly switched until the object departs from the first control region. When the object moves to the second controller, the light intensity of the light source would be ceaselessly switched until the object departs from the second controller.

SUMMARY OF THE INVENTION

Accordingly, the invention is directed to a lighting device and a method for adjusting the sensing region thereof, which may self-adjust the position and the size of the sensing region.

Other objectives and advantages of the invention should be further indicated by the disclosures of the invention, and omitted herein for simplicity.

To achieve one of, a part of or all of the above-mentioned advantages, or to achieve other advantages, an embodiment of the invention provides a lighting device, which includes a sensing device and an illumination unit. The sensing device detects whether an object is located at a first manipulating region or a second manipulating region so as to correspondingly emit a control signal, in which the first manipulating region and the second manipulating region are not overlapped by each other and are disposed along a sensing direction of the sensing device. The sensing device adjusts a shortest distance between the sensing region and the sensing device and a sensing range of the sensing region according to a first adjustment signal and a second adjustment signal. The illumination unit is coupled to the sensing device and adjusts the optical characteristic according to the control signal.

To achieve one of, a part of or all of the above-mentioned advantages, or to achieve other advantages, an embodiment of the invention further provides a method for adjusting the sensing region of a lighting device, which includes following steps. A first adjustment signal is received. A second adjustment signal is received. A shortest distance between a sensing region and a sensing device of the lighting device and a sensing range of the sensing region are adjusted according to the first adjustment signal and the second adjustment signal, in which the sensing region includes a first manipulating region and a second manipulating region, and the first manipulating region and the second manipulating region are not overlapped by each other and are disposed along a sensing direction of the sensing device.

Based on the depiction above, in the above-mentioned embodiments of the invention, the lighting device and the method for adjusting the sensing region thereof decide a sensing range of the sensing region and a shortest distance between the sensing region and the sensing device according to a first adjustment signal and a second adjustment signal. In this way, the position and the size of the sensing region of the lighting device may be adjusted according to the first adjustment signal and the second adjustment signal.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following, a plurality of depicted embodiments together with the included drawings are intended to explain the feasibility of the invention, wherein a same notation or a similar notation is for marking the same or the similar portions. Note that some of expression words hereinafter regarding direction or orientation, such as 'up', 'down', 'front', 'behind', 'left', 'right', and the like, are to describe, not to limit, the invention. It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
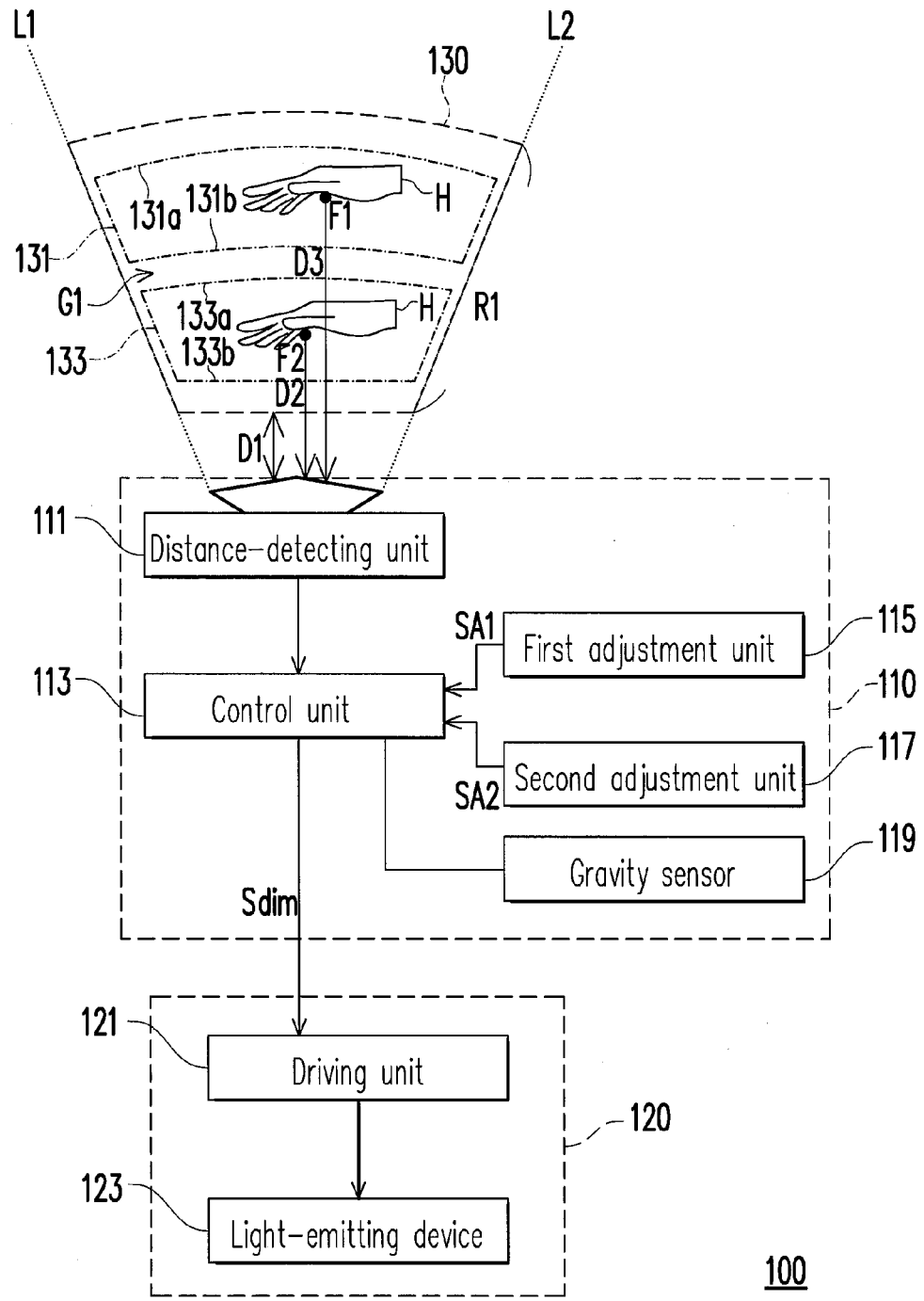
FIG. 1 is a system diagram of a lighting device according to an embodiment of the invention.

FIG. 1 is a system diagram of a lighting device according to an embodiment of the invention. Referring to FIG. 1, in the embodiment, a lighting device 100 includes a sensing device 110 and an illumination unit 120. The sensing device 110 detects whether an object (for example, a hand H) is located at a first manipulating region 131 or a second manipulating region 133 in a sensing region 130 so as to correspondingly emit a control signal Sdim, in which the manipulating function of the lighting device 100 corresponding to one of the first manipulating region 131 and the second manipulating region 133 may be to adjust up the optical characteristic of the illumination unit 120, while the manipulating function of the lighting device 100 corresponding to another of the first manipulating region 131 and the second manipulating region 133 may be to adjust down the optical characteristic of the illumination unit 120. The optical characteristic of the illumination unit herein may be color temperature value or light intensity, by which the color temperature value or the light intensity of the lighting device 100 is adjusted. In following, the adjustment of light intensity is exemplarily depicted with examples.

In the sensing region 130, the first manipulating region 131 and the second manipulating region 133 are not overlapped by each other and are disposed along a sensing direction of the sensing device 110 (for example, along any radial line taking the sensing device 110 as the initial point between two dotted lines L1 and L2), in which the two dotted lines L1 and L2 define a detectable range of the sensing device 110. The sensing device 110 adjusts a shortest distance D1 between the sensing region 130 and the sensing device 110 and a sensing range R1 of the sensing region 130 according to a first adjustment signal SA1 and a second adjustment signal SA2 (the adjustment method is depicted later).

The illumination unit 120 is coupled to the sensing device 110 to adjust the light-emitting luminance of the illumination unit 120 according to the control signal Sdim, in which the control signal Sdim may be a wire signal or a wireless signal, i.e., the sensing device 110 may be connected to the illumination unit 120 though a trace coupling or a wireless transceiver. In addition, there is a non-sensing gap G1 between the first manipulating region 131 and the second manipulating region 133, and the non-sensing gap G1 has no corresponding manipulating function of the lighting device 100 so as to avoid the circumstance that an object (for example, a hand H) located between the first manipulating region 131 and the second manipulating region 133 is unable to be clearly distinguished to cause manipulating fault of the lighting device 100.

In more details, the illumination unit 120 includes a driving unit 121 and a light-emitting device 123. The light-emitting device 123 may include at least one light emitting diode or at least one bulb to provide an illumination function. The driving unit 121 is coupled to the light-emitting device 123 and the sensing device 110 to drive the light-emitting device 123 and adjust the light-emitting luminance of the light-emitting device 123 according to the control signal Sdim. The sensing device 110 includes a distance-detecting unit 111, a control unit 113, a first adjustment unit 115 and a second adjustment unit 117. The distance-detecting unit 111 detects the distance (for example, D2 or D3) between an object (for example, a hand H) and the sensing device 110 and the distance-detecting unit 111 may detect the distance between an object (for example, a hand H) and the sensing device 110 through ultrasound.

The first adjustment unit 115 is for outputting the first adjustment signal SA1 and the second adjustment unit 117 is for outputting the second adjustment signal SA2. The control unit 113 is coupled to the distance-detecting unit 111, the first adjustment unit 115 and the second adjustment unit 117 so as to adjust a shortest distance D1 between the sensing region 130 and the sensing device 110 and a sensing range R1 of the sensing region 130 according to the first adjustment signal SA1 and the second adjustment signal SA2. The control unit 113 determines whether the object (for example, a hand H) is located at the first manipulating region 131 or the second manipulating region 133 according to the distance (for example, D2 or D3) and thereby produces the control signal Sdim.

In an embodiment, the control unit 113 determines the shortest distance D1 according to the first adjustment signal SA1 and the sensing range R1 according to the second adjustment signal SA2. If the first adjustment unit 115 and the second adjustment unit 117 respectively include a rotary switch, the control unit 113 may determine the shortest distance D1 according to the voltage level of the first adjustment signal SA1 and the sensing range R1 according to the voltage level of the second adjustment signal SA2, in which the shortest distance D1 may be directly proportional to or inversely proportional to the voltage level of the first adjustment signal SA1, and the sensing range R1 may be directly proportional to or inversely proportional to the voltage level of the second adjustment signal SA2, which the people skilled in the art may self-modify according to the spirit of the embodiment of the invention and the invention is not limited to.

If the first adjustment unit 115 and the second adjustment unit 117 respectively include a key, as the control unit 113 receives the first adjustment signal SA1, the value of the shortest distance D1 would be cyclically switched within a preset distance range (for example, 3 cm-25 cm) and as the control unit 113 receives the second adjustment signal SA2, the sensing range R1 would be cyclically switched within a preset width range (for example, 20 cm-40 cm). The switching directions for the shortest distance D1 and the sensing range R1 may be changed in ascending way or in descended way and the step interval of each switching may be self-set by the people skilled in the art or different according to different application environments, which the embodiment of the invention is not limited to.

If the first adjustment unit 115 and the second adjustment unit 117 respectively include two keys, the two keys of the first adjustment unit 115 are respectively corresponding to increasing the shortest distance D1 and decreasing the shortest distance D1, while the two keys of the second adjustment unit 117 are respectively corresponding to increasing the sensing range R1 and decreasing the sensing range R1. As the control unit 113 receives the first adjustment signal SA1, the shortest distance D1 would be correspondingly increased or decreased. As the control unit 113 receives the second adjustment signal SA2, the sensing range R1 would be correspondingly increased or decreased.

According to the depiction above, in the embodiment, the sensing device 110 determines the shortest distance D1 according to the first adjustment signal SA1 and the sensing range R1 according to the second adjustment signal SA2.

In another embodiment, as the control unit 113 receives the first adjustment signal SA1, the distance-detecting unit 111 measures a distance (for example, D3) between the present object (for example, a hand H) and the sensing device 110; as the control unit 113 receives the second adjustment signal SA2, the distance-detecting unit 111 measures another distance (for example, D2) between the present object (for example, a hand H) and the sensing device 110. The control unit 113 would determine the first manipulating region 131 and the second manipulating region 133 according to the measured distance.

In more details, assuming as the control unit 113 receives the first adjustment signal SA1 the measured distance between the object (for example, a hand H) and the sensing device 110 is D3 (i.e., the first distance) and as the control unit 113 receives the second adjustment signal SA2 the measured distance between the object (for example, a hand H) and the sensing device 110 is D2 (i.e., the second distance). Then, the control unit 113 would determine the border 131$b$ of the first manipulating region 131, the border 133$a$ of the second manipulating region 133 and the non-sensing gap G1 according to the reference point F1 at the first manipulating region 131 of the distance D3 and the reference point F2 at the second manipulating region 133 of the distance D2. Herein, the non-sensing gap G1 may be disposed between the border 131$b$ and the border 133$a$, and the width of the non-sensing gap G1 may be a fixed width or the product of the distance between the reference point F1 and the reference point F2 and a fixed ratio.

After that, the border 131$a$ of the first manipulating region 131 is determined according to the reference point F1 and the border 131$b$ of the first manipulating region 131, in which the distance between the reference point F1 and the border 131$a$ may be the same as the distance between the reference point F1 and the border 131$b$. Moreover, the border 133$b$ of the second manipulating region 133 is determined according to the reference point F2 and the border 133$a$ of the second manipulating region 133, in which the distance between the reference point F2 and the border 133$b$ may be the same as the distance between the reference point F2 and the border 133$a$. Since the distances between the first manipulating region 131 and the sensing region 130 and between the second manipulating region 133 and the sensing region 130 may be preset in advance, so that after the first manipulating region 131 and the second manipulating region 133 are determined, the shortest distance D1 and the sensing range R1 of the sensing region 130 are accordingly determined as well.

Continuing referring to FIG. 1, the illumination unit 120 of the lighting device 100 is usually to downwards illuminate, and in different embodiments, the sensing device 110 and the illumination unit 120 of the lighting device 100 may be disposed at a same side or oppositely to each other. As a result, the sensing direction of the sensing device 110 is possibly upwards or downwards. At the time, in order to make the operation habit of a user unvaried with the sensing direction of the sensing device 110, the sensing device 110 may employ a gravity sensor 119. The control unit 113 is able to know whether the sensing direction is upwards or downwards through the gravity sensor 119 and thereby determine the manipulating functions respectively corresponding to the first manipulating region 131 and the second manipulating region 133.

Figure 2:
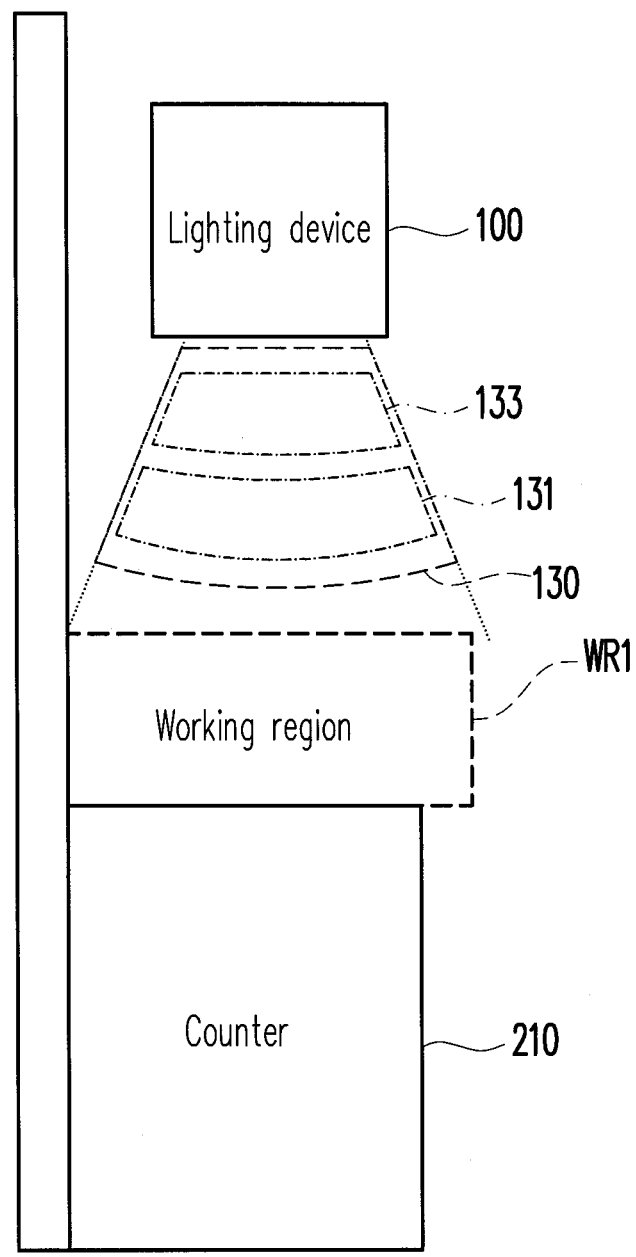
FIG. 2 is an application diagram of a lighting device according to an embodiment of the invention.

FIG. 2 is an application diagram of a lighting device according to an embodiment of the invention. Referring to FIGS. 1 and 2, in the embodiment, assuming the lighting device 100 is used in a kitchen and the working region WR1 on a counter 210 is a place which a hand often contacts, thus, the sensing region 130 of the lighting device 100 may be adjusted to be close to but higher than the working region WR1 so as to reduce the chance for the user to wrongfully-touch and facilitate the manipulating of the user on the lighting device 100. In the embodiment, one of the manipulating ways of the lighting device 100 is that when a hand is waved in the sensing region 130, i.e., when the hand remains with a preset time (for example, with 0.2-0.5 second) at the sensing region 130, the sensing device 110 would turn on or off the illumination unit 120 through the control signal Sdim; when the hand remains at the first manipulating region 131 with a preset time (for example, the preset time is greater than 0.5 second), the sensing device 110 would control the illumination unit 120 through the control signal Sdim to adjust down the light-emitting luminance; when the hand remains at the second manipulating region 133 with a preset time (for example, the preset time is greater than 0.5 second), the sensing device 110 would control the illumination unit 120 through the control signal Sdim to adjust up the light-emitting luminance; in addition, if the sensing device 110 has sensed the object remains at the sensing region 130 with a preset time (for example, the preset time is less than 0.2 second), it may be determined that an inappropriate object may enter the region or the user has wrongful actions, and the sensing device 110 would not act on the lighting device 100. It should be noted that the preset time may be self-set by the people skilled in the art or different according to the different application environments, which the invention is not limited to.

Figure 3:
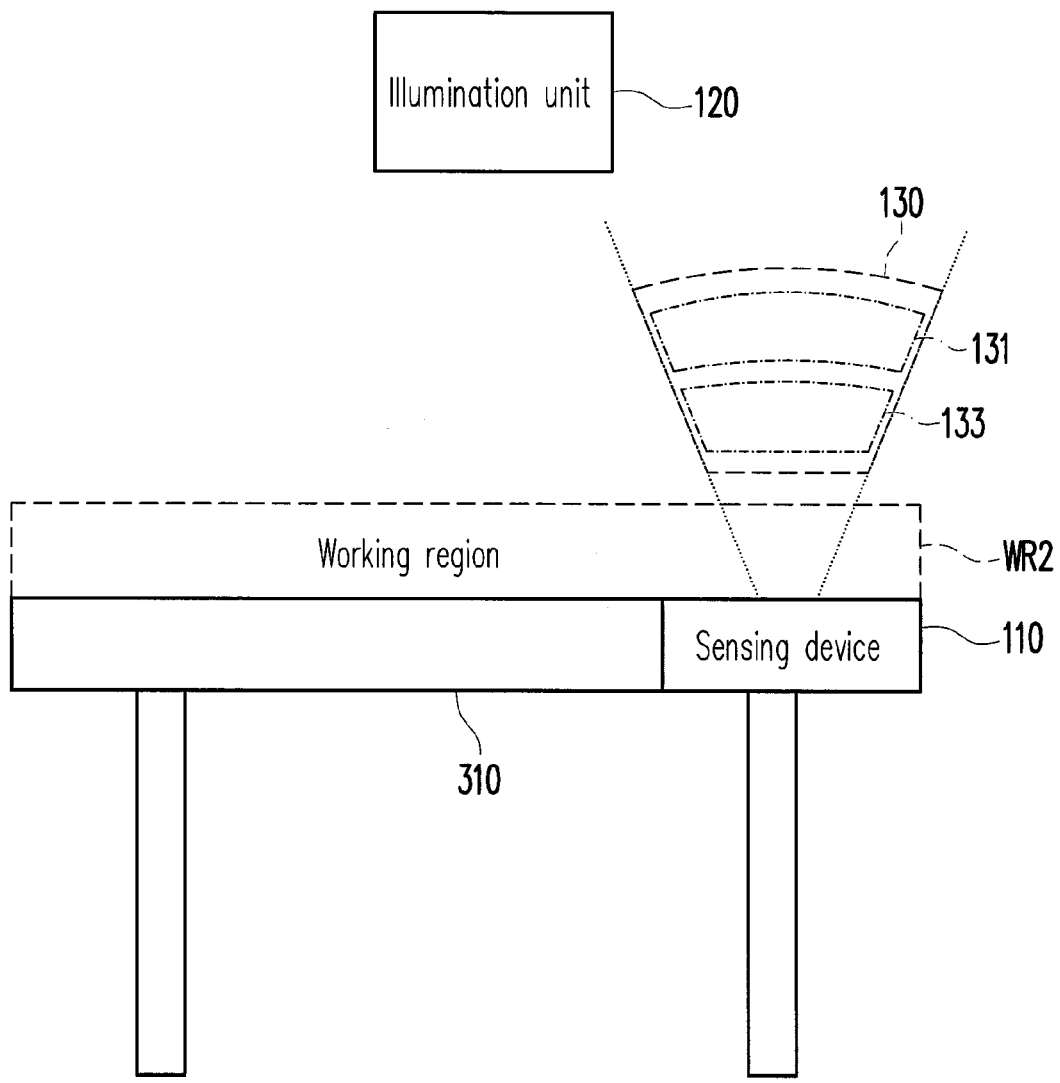
FIG. 3 is another application diagram of a lighting device according to an embodiment of the invention.

FIG. 3 is another application diagram of a lighting device according to an embodiment of the invention. Referring to FIGS. 1 and 3, the sensing device 110 and the illumination unit 120 in the lighting device 100 of the embodiment are located at the two opposite sides of the working region WR2, i.e., the sensing device 110 and the illumination unit 120 may be separately installed. For example, the sensing device 110 is disposed on a table 310 and the working region WR2 on the table 310 is a place which a hand often contacts. Hence, the sensing region 130 of the lighting device 100 may be adjusted to be close to but higher than the working region WR2 so as to reduce the chance for the user to wrongfully-touch and facilitate the manipulating of the user on the lighting device 100. In the embodiment, the manipulating way of the lighting device 100 is similar to the mentioned above except that when the hand is located at the first manipulating region 131, the sensing device 110 would control the illumination unit 120 through the control signal Sdim to adjust up the light-emitting luminance; when the hand is located at the second manipulating region 133, the sensing device 110 would control the illumination unit 120 through the control signal Sdim to adjust down the light-emitting luminance.

According to the mentioned above, no matter the sensing direction of the sensing device 110 is upwards or downwards, the sensing device 110 may set the upper manipulating region as the one corresponding to one of the manipulating functions of the lighting device 100 and set the lower manipulating region as the other one corresponding to another of the manipulating functions of the lighting device 100 through the gravity sensor 119. In this way, the user has no need to adjust the operation habit thereof and may be adapted to every disposition way of the lighting device 100. It should be noted that the lighting device manipulating functions in the above-mentioned embodiments are exemplarily depicted, which the invention is not limited to.

Figure 4:
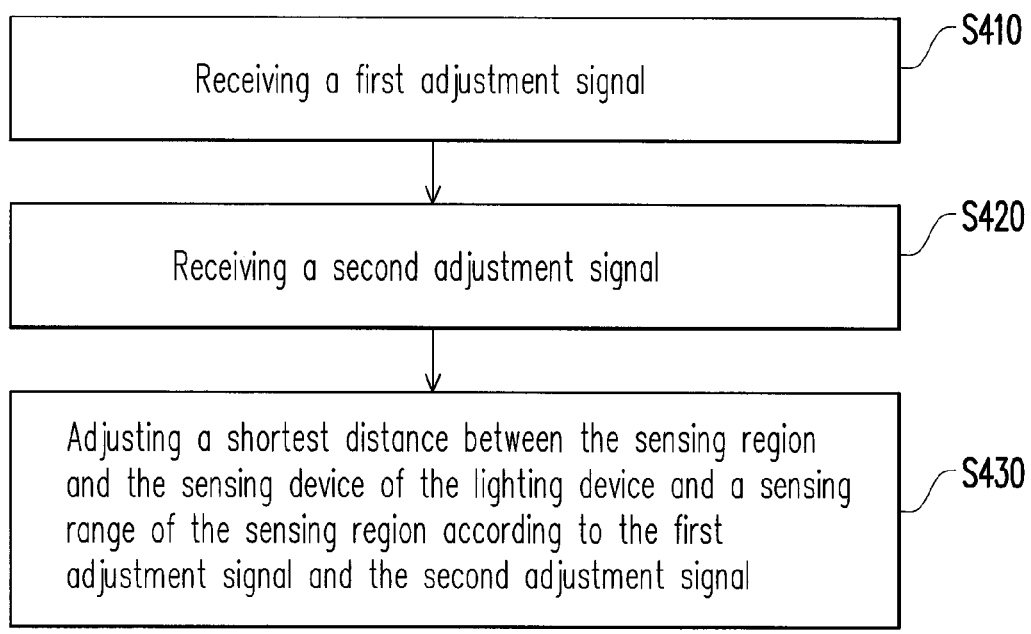
FIG. 4 is a flow chart diagram of a method for adjusting the sensing region of a lighting device according to an embodiment of the invention.

Based on the depiction above, a method for adjusting the sensing region of a lighting device may be summarized. FIG. 4 is a flow chart diagram of a method for adjusting the sensing region of a lighting device according to an embodiment of the invention. Referring to FIG. 4, the method for adjusting the sensing region of a lighting device in the embodiment includes following steps: receiving a first adjustment signal (step S410); receiving a second adjustment signal (step S420); adjusting a shortest distance between the sensing region and the sensing device of the lighting device and a sensing range of the sensing region according to the first adjustment signal and the second adjustment signal (step S430).

Moreover, the lighting device 100 may determine the shortest distance between the sensing region and the sensing device of the lighting device according to the first adjustment signal and determine the sensing range of the sensing region according to the second adjustment signal. Or, as receiving the first adjustment signal, the first manipulating region is determined according to the first distance between the object and the sensing device and as receiving the second adjustment signal, the second manipulating region is determined according to the second distance between the object and the sensing device. Further, the sensing range of the sensing region and the shortest distance between the sensing region and the sensing device are determined according to the first manipulating region and the second manipulating region.

In summary, in the above-mentioned embodiments of the invention, the lighting device and the method for adjusting the sensing region thereof deter mine the sensing range of the sensing region and the shortest distance between the sensing region and the sensing device according to the first adjustment signal and the second adjustment signal. In this way, the sensing region of the lighting device may be adjusted according to the first adjustment signal and the second adjustment signal. Moreover, the sensing region of the lighting device may be adjusted to sitting over the working region to reduce the chance for the user to wrongfully-touch and facilitate the manipulating of the user on the lighting device. In the embodiment, the sensing device may employ a gravity sensor to correspondingly adjust the manipulating functions of the lighting device respectively corresponding to the manipulating regions and thereby reduce the un-adaptation of the user on the manipulating of the lighting device.

It should be noted that the first and the second manipulating regions, the first and the second adjustment signals, the first and the second adjustment units and the first and the second distances and so on are used to represent the part names, not to limit, the upper limit or the lower limit of the part quantity of the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lighting device, comprising a sensing device having a first adjustment unit for outputting a first adjustment signal and a second adjustment unit for outputting a second adjustment signal;
   a control unit, coupled to the first and second adjustment units;
   wherein the sensing device configured to detect whether an object is located at a first manipulating region or a second manipulating region so as to correspondingly emit a control signal, wherein the first manipulating region and the second manipulating region are not overlapped by each other and are disposed in a sensing region along a sensing direction of the sensing device, and the sensing device adjusts a shortest distance between the sensing region and the sensing device and a sensing range of the sensing region according to the first adjustment signal and the second adjustment signal; and
   an illumination unit, coupled to the sensing device and adjusting an optical characteristic according to the control signal.

2. The lighting device as claimed in claim 1, wherein the sensing device determines the shortest distance according to the first adjustment signal and determines the sensing range according to the second adjustment signal.

3. The lighting device as claimed in claim 2, wherein the sensing device comprises:
   a distance-detecting unit, configure to detect a distance between the object and the sensing device;
   wherein the control unit determines the shortest distance according to the first adjustment signal and determines the sensing range according to the second adjustment signal and the control unit determines whether the object is located at the first manipulating region or the second manipulating region according to the distance so as to produce the control signal.

4. The lighting device as claimed in claim 3, wherein the first adjustment unit and the second adjustment unit respectively comprise a rotary switch.

5. The lighting device as claimed in claim 4, wherein the shortest distance is determined according to the voltage level of the first adjustment signal and the sensing range is determined according to the voltage level of the second adjustment signal.

6. The lighting device as claimed in claim 3, wherein the first adjustment unit and the second adjustment unit respectively comprise a key.

7. The lighting device as claimed in claim 6, wherein as the control unit receives the first adjustment signal, the value of the shortest distance is cyclically switched within a preset distance range and as the control unit receives the second adjustment signal, the sensing range is cyclically switched within a preset width range.

8. The lighting device as claimed in claim 1, wherein as the sensing device receives the first adjustment signal, a first distance between the object and the sensing device is measured, as the sensing device receives the second adjustment signal, a second distance between the object and the sensing device is measured, the sensing device determines the first manipulating region and the second manipulating region according to the first distance and the second distance and determines the sensing range of the sensing region and the shortest distance between the sensing region and the sensing device according to the first manipulating region and the second manipulating region.

9. The lighting device as claimed in claim 8, wherein the sensing device comprises:
   a distance-detecting unit, configure to detect a distance, the first distance and the second distance between the object and the sensing device;
   wherein as receiving the first adjustment signal, the distance-detecting unit measures the first distance, as receiving the second adjustment signal, the distance-detecting unit measures the second distance, the control unit determines the first manipulating region and the second manipulating region according to the first distance and the second distance, determines the sensing range of the sensing region and the shortest distance between the sensing region and the sensing device according to the first manipulating region and the second manipulating region and determines whether the object is located at the first manipulating region or the second manipulating region according to the distance so as to produce the control signal.

10. The lighting device as claimed in claim 1, wherein the illumination unit comprises:
    a light-emitting device, providing an illumination function; and
    a driving unit, coupled to the light-emitting device and the sensing device for driving the light-emitting device and adjusting the light-emitting luminance of the light-emitting device according to the control signal.

11. The lighting device as claimed in claim 1, wherein the optical characteristic comprises color temperature value or light intensity.

12. The lighting device as claimed in claim 1, wherein when the object is located at the first manipulating region, the sensing device adjusts down the optical characteristic of the illumination unit through the control signal, and when the object is located at the second manipulating region, the sensing device adjusts up the optical characteristic of the illumination unit through the control signal.

13. The lighting device as claimed in claim 12, wherein the sensing device comprises a gravity sensor, the sensing device determines whether the sensing direction is upwards or downwards according to the gravity sensor and thereby determines the manipulating functions of the lighting device respectively corresponding to the first manipulating region and the second manipulating region.

14. The lighting device as claimed in claim 1, wherein when the object is located at the sensing region and within a preset time, the sensing device turns off or on the illumination unit through the control signal.

15. The lighting device as claimed in claim 1, wherein there is a non-sensing gap between the first manipulating region and the second manipulating region.

16. A method for adjusting the sensing region of a lighting device, comprising:
    receiving a first adjustment signal;
    receiving a second adjustment signal; and
    adjusting a shortest distance between a sensing region and a sensing device of the lighting device and a sensing range of the sensing region according to the first adjustment signal and the second adjustment signal, wherein the sensing region comprises a first manipulating region and a second manipulating region, and the first manipulating region and the second manipulating region are not overlapped by each other and are disposed along a sensing direction of the sensing device.

17. The method for adjusting the sensing region of a lighting device as claimed in claim 16, wherein the steps of adjusting the shortest distance between the sensing region and the sensing device of the lighting device and the sensing range of the sensing region comprise:
    determining the shortest distance according to the first adjustment signal; and
    determining the sensing range according to the second adjustment signal.

18. The method for adjusting the sensing region of a lighting device as claimed in claim 16, wherein the steps of adjusting the shortest distance between the sensing region and the sensing device of the lighting device and the sensing range of the sensing region comprise:
    as receiving the first adjustment signal, the first manipulating region is determined according to a first distance between an object and the sensing device;
    as receiving the second adjustment signal, the second manipulating region is determined according to a second distance between the object and the sensing device; and
    determining the sensing range and the shortest distance according to the first manipulating region and the second manipulating region.

* * * * *